May 19, 1959 | A. A. BROWN | 2,887,659

SIGNAL NETWORK

Filed July 26, 1955

INVENTOR.
ABBOTT A. BROWN
BY
Oscar B Brumback
ATTORNEY

United States Patent Office 2,887,659

Patented May 19, 1959

2,887,659

SIGNAL NETWORK

Abbott A. Brown, Paramus, N.J., assignor to Bendix Aviation Corporation, Teterboro, N.J., a corporation of Delaware Application July 26, 1955, Serial No. 524,399

8 Claims. (Cl. 332—1)

This invention relates generally to electric signal systems and, more particularly, to networks for separating the high and low frequency components impressed on a carrier wave.

Separating the high and low frequency envelope components of a carrier wave has heretofore involved a loss of signal strength as the signal passed through the separating network. Thus, it has usually been necessary to place a preamplifier before the separating network to compensate for the attenuation. This increased the possibility of signal distortion and limited the use of such networks in locations where shocks and vibrations are factors.

The present invention contemplates a novel network which may be either a low pass or high pass filter, and which utilizes no vacuum tubes yet is capable of power gains so that the time constants may involve reasonably long intervals.

The novel network contemplated demodulates a suppressed carrier wave to develop a differential output, changes the characteristic of the output in a shaping circuit, and applies the modified output to a modulator which, then, develops a usable output corresponding to a carrier wave with the modified component of the input signal impressed thereon. This output may be utilized directly or it may be fed back, for example, to cancel the low frequency component of the input signal so that a usable output corresponding to the high frequency component can be obtained.

Although two embodiments of the invention have been illustrated and described in detail, it is to be expressly understood that invention is not limited thereto. Various changes can be made in the design and arrangement of the parts without departing from the spirit and scope of the invention as will now be understood by those skilled in the art.

Figure 1:
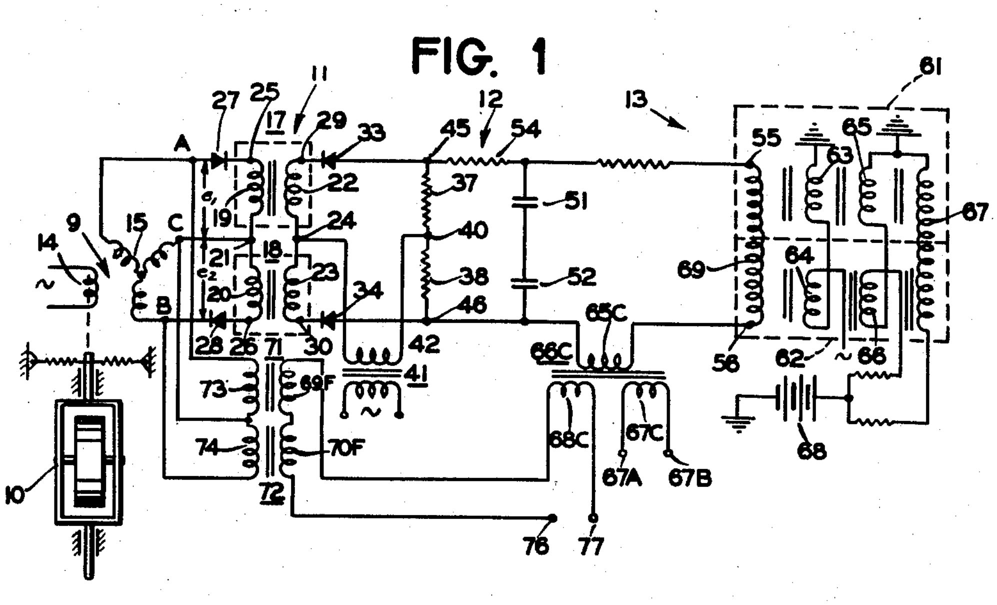
Figure 2:
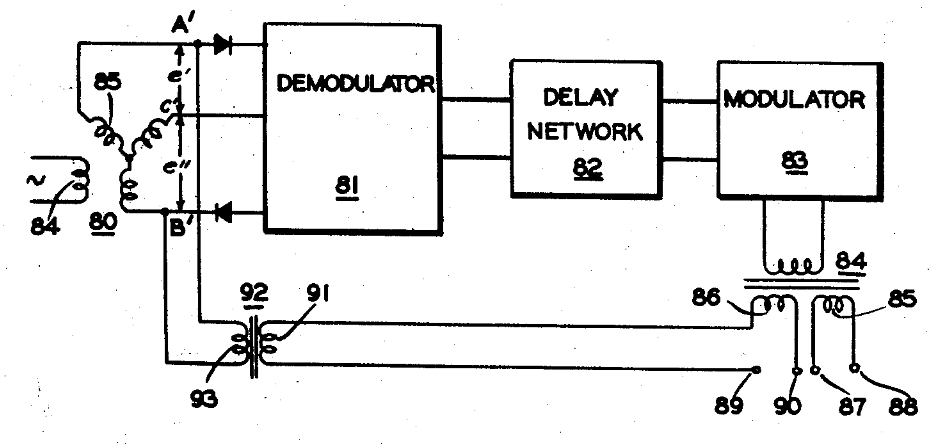

In the single sheet of drawing:

Figure 1 illustrates schematically one embodiment of the electrical filter network of the present invention; and Figure 2 illustrates another embodiment of the novel electrical network.

The novel electrical network of the present invention is particularly adapted for separating the frequency components of a reference signal developed for control systems. As an example, it is well known that the rate gyro in the yaw control channel of an automatic pilot system responds both to the rate of turning of the craft about the yaw axis of the craft and to the rate of turning of the craft about a point in space. Thus, a signal developing device actuated by the rate gyro generates a signal having two components: a relatively low frequency component corresponding to the turning of the craft about a point in space and a relatively high frequency component corresponding to the turning of the craft about its own axis. Frequently, it is desirable to separate these components to obtain more precise control of the craft. The drawing illustrates a system wherein the two signal components resulting from a rate gyro are to be separated.

The term frequency component is used herein to indicate a frequency group instead of a single frequency.

A signal device 9 in Figure 1 is actuated by a conventional rate gyroscope 10, and the novel filter network is interposed between the signal device and the control system; the novel network is connected to signal generator 9 and comprises generally a demodulator 11, a wave shaping device or delay network 12, and a modulator 13.

Signal device 9 may be a conventional inductive device having a rotor and a stator. As illustrated herein, a two-pole single phase wound rotor 14 is mounted for rotation relative to a three-phase Y-connected wound stator 15. Rotor 14 is energized by a source of alternating current of the carrier wave frequency and induces three distinct voltages in the stator: one in each of the three windings, A, B and C. The sum of the voltages remains constant, although the rotation of rotor 14 with respect to the stator 15 changes the voltage induced in each leg. At its null position, rotor 14 is positioned relative to stator 15 so that the voltage across legs A and B has some finite value which is the sum of the voltage $e_1$ between legs A and C and the voltage $e_2$ between legs C and B. These voltages are applied to demodulator 11.

Demodulator 11 comprises a pair of balanced saturable reactors or transformers 17 and 18. The primary windings 19 and 20 of these transformers are connected at a common junction 21 and the secondary windings 22 and 23 are connected at a common junction 24. The end terminals 25 and 26 of the primary windings are connected to legs A and B of stator 15 through a pair of rectifiers 27 and 28 whose polarities are in opposed relationship, and the end terminals 29 and 30 of the secondary windings 22 and 23 are connected together through a pair of rectifiers 33 and 34 and resistors 37 and 38. The polarities of rectifiers 33 and 34 are in the same direction. The common junction 24 of secondary windings 22 and 23 and the common junction 40 of resistors 37 and 38 are connected to a transformer 41 for excitation by a suitable source of alternating current.

When rotor 14 is at null position relative to stator 15, the excitation applying to the secondary windings 22 and 23 by transformer 41 is such with respect to the excitation applied to primary winding 19 that rectifiers 27 and 33 conduct on alternate half cycles. In the half cycle during which rectifier 33 is conductive, the direct current impulse applied through rectifier 33 is sufficient to bring the core of transformer 17 to saturation at the quarter cycle so that the inductive impedance of the transformer is reduced to substantially zero for the following quarter cycle, and the full value of the voltage from transformer 41 is applied across resistor 37. In the following half cycle, rectifier 33 is non-conductive and the impulse applied across rectifier 27 from inductive device 9 is just sufficient to reduce the magnetization of the core to the original zero point. A similar operation takes place at transformer 18. Thus the demodulator is energized to the midpoint of its usable range and equal and opposite impulses are applied across resistors 37, 38 and the net voltage is zero.

A displacement of rotor 14 from a null position relative to stator 15 changes the voltage in each leg of the stator. Depending upon the direction of this displacement, a greater impulse is applied through one rectifier 27 or 28 and a lesser impulse through the other. The transformer receiving the greater impulse is reset to a lower magnetization level and the one receiving the lesser impulse is reset to a higher magnetization level. On the next half cycle, the transformer which was reset to the higher magnetization level becomes saturated before the quarter cycle is reached, and the full voltage is passed through its rectifier 33 or 34 for a period of time longer than the normal quarter cycle; the transformer which was reset to a lower magnetization level requires a period longer than a normal quarter cycle to reach saturation, and a lesser voltage is applied through its rectifier. As a result, the balanced condition no longer exists across terminals 45 and 46 and a differential voltage develops.

It will now be apparent that where, in prior art devices, a loss in signal occurs as the signal is passed through the filter network, a small signal input to demodulator 11 in the present invention may develop at terminals 45 and 46 an output substantially greater than the input.

The differential voltage at terminals 45 and 46 is applied across a suitable shaping network. The network herein is an RC network 12 comprised of capacitors 51 and 52 and resistor 54. As is well known, this network will delay the appearance of this differential voltage across terminals 55 and 56 of the modulator 13 for a period of time determined by the time constant of the network. The modulator 13 responds to the differential voltage at terminals 55 and 56 to develop an alternating current signal corresponding in amplitude and phase to the magnitude and sense of this differential voltage.

Modulator 13 comprises generally two toroidal cores 61 and 62, each having four windings. Primary windings 63 and 64 are excited from a suitable source of alternating current; bias windings 65, 66 and balance winding 67 are excited from a suitable direct current source such as illustrated by battery 68; and control and output winding 69 is connected across terminals 55 and 56. The primary windings and bias windings are connected in series opposition.

When the net voltage across resistors 37, 38 is zero + toroidal cores 61 and 62 are magnetized to the same extent so that equal and opposite voltages are induced in the control windings by the primary windings and no net voltage develops across terminals 55 and 56. The appearance of a direct current voltage across these terminals, however, causes a direct current to flow through the control winding. This provides a flux which adds to the direct current flux provided by one bias winding and which subtracts from the direct current flux provided by the other bias winding. As a result, cores 61 and 62 are no longer magnetized alike, and a differential alternating current voltage is developed across terminals 55 and 56. This differential voltage is applied to the primary winding 65C of coupling transformer 66C having a pair of secondary windings 67C and 68C.

The output across terminals 67A and 67B of secondary winding 67C corresponds to the low frequency component of the input signal supplied by inductive device 9. So that the output across terminals 76 and 77 will correspond to the high frequency component of the input signal supplied by inductive device 9, secondary winding 68C is connected in series with the secondary windings 69F and 70F of a pair of transformers 71 and 72. The primary windings 73 and 74 of transformers 71 and 72 are connected across legs A and C, and legs B and C, respectively, so that the signal coupled across secondary windings 69F and 70F corresponds to the input signal having high and low frequency components. The signal coupled across secondary winding 68C, on the other hand, corresponds only to the low frequency component. Thus, by combining the signal from winding 68C degeneratively with the signals across windings 69F and 70F, the low frequency component is cancelled and the output across terminals 76 and 77 corresponds to the high frequency component of the input signal.

In the embodiment shown in Figure 2, inductive signal developing device 80 is connected to a demodulator 81 which is connected by a delay network 82 to a modulator 83. These elements may be similar to the corresponding elements described above except that rotor 84 has a normal position with respect to stator 85 such that the voltage across legs A′ and B′ corresponds to the difference of the voltage $e'$ between legs A′ and C′ and the voltage $e''$ between legs C′ and B′. At null, this voltage is zero. Demodulator 81 demodulates the differential output between legs A′ and B′ to provide a differential direct current which corresponds in magnitude and sense to the amplitude and phase of the alternating current signal as before and which is applied through a delay network 82 to modulator 83 whose output is coupled across transformer 84 to secondary windings 85 and 86. The output across terminals 87 and 88 of secondary winding 85 corresponds to the low frequency component of the input signal.

The output across terminals 89 and 90 of secondary winding 86 corresponds to the high frequency component of the input signal. To this end, secondary winding 86 is connected in series to the secondary winding 91 of a transformer 92 whose primary winding 93 is connected across legs A′ and B′. The signal on secondary winding 86 corresponds to the low frequency components of the input signal. By combining the signal on secondary winding 86 degeneratively with the signal on secondary winding 91, the low frequency components cancel and the signal from terminals 89 and 90 correspond to the high frequency component of the input signal.

The foregoing has described a network for changing the characteristics of a control signal such as, for example, by separating the signal components of a control signal. No power loss need be suffered in the change or separation and power gains may be had if desired. Thus, time constants of substantially long duration may be employed.

Although only two embodiments of the invention have been illustrated and described in detail, it is to be expressly understood that invention is not limited thereto. Various changes can be made in the design and arrangement of the parts without departing from the spirit and scope of the invention as will now be understood by those skilled in the art.

What is claimed:

1. In a network, a two-part signal developing device, the first of said parts having three legs whose voltage relationship is varied in response to the displacement of the second part relative to said first part, a balanced demodulator for receiving said voltages and becoming unbalanced to develop a differential direct current whose magnitude and sense correspond to the amplitude and phase of the difference in voltage level between two of said legs with respect to the third leg, means responsive to said differential voltage for developing a delayed output, and means energized by a carrier wave and responsive to said delayed output for modulating said carrier wave in accordance with said delayed output.

2. In a network, a two-part signal developing device whose first part has three legs in which the voltage relationship is varied in response to the displacement of the second part from a null position relative to the first part, a demodulator including a pair of saturable reactors having primary and secondary windings, rectifiers connecting each primary winding to two legs of said signal device whereby normal pulsed currents through said rectifiers magnetize said reactors to a predetermined level, means energizing said secondary windings by other pulsed electric currents adapted to return said reactors to said predetermined level of magnetization, whereby displacement of said parts develops differential pulses to said primary windings to develop an output at said secondary windings, a delay network connected across said reactors whereby only that output predetermined by the time constant of said delay network is passed as a delayed output, and a modulator responsive to said delayed output for developing an alternating current output corresponding in amplitude and phase to the magnitude and sense of said delayed output.

3. In a signal system, a signal device having a single phase wound rotor displaceable relative to a three-phase Y-connected wound stator, means energizing said rotor by alternating current whereby alternating current voltage is induced in each of said stator windings, a balanced demodulator connected across said stator windings and normally energized by said voltage to the midpoint of its usable range, said demodulator being unbalanced as said rotor is displaced to develop a differential direct current output, means for varying the characteristic of said output, and modulator means energized by alternating current and responsive to said direct current output for developing an alternating current output varying in amplitude and phase with the magnitude and sense of said direct current output.

4. A network for separating the modulation frequency components of a modulated carrier wave, comprising a demodulator receiving the modulated carrier wave and developing a differential direct current voltage whose magnitude and sense corresponds to the amplitude and phase of the modulation components, a delay network receiving the differential voltage and responsive to one frequency component for developing an output corresponding thereto, a modulator energized by a carrier voltage and receiving said last named output and modulating said carrier voltage thereby to develop a first frequency modulated output, and means for degeneratively combining the first frequency modulated output with the modulated carrier wave input to provide a second frequency modulated output.

5. In a signal system, a two part signal developing device whose first part has three legs in which the voltage relationship is varied in response to displacement of the second part relative to the first part from a null position, means energizing said second part by alternating current whereby a signal is developed having a carrier wave modulated by low and high frequency components, and means for developing a carrier wave output for each frequency component comprising a balanced demodulator for receiving said signal and becoming unbalanced to develop a differential direct current whose magnitude and sense corresponds to the amplitude and phase respectively of the modulation components, a delay network responsive to the low frequency component for developing an output corresponding thereto, a modulator energized by a carrier wave and receiving said last named output and modulating said carrier wave thereby to develop an output corresponding to the carrier wave with an envelope frequency corresponding to the low frequency component of the carrier wave input, and means for degeneratively combining the output of the modulator with the signal to develop an output corresponding to the carrier wave with an envelope frequency corresponding to the high frequency component of the carrier wave input.

6. A network having an input receiving a carrier wave modulated by both low and high frequency components, comprising a balanced demodulator including a pair of saturable reactors having primary and secondary windings, rectifiers connecting each primary winding to the input so that normal pulsed currents through the rectifiers magnetize the reactors to a predetermined level, means energizing the secondary windings by other pulsed electric currents to return the reactors to the predetermined level of magnetization, a delay network responsive to the low frequency component for developing an output corresponding thereto, and a modulator energized by a carrier wave for receiving said last named output and modulating said carrier wave thereby to develop an output corresponding to the carrier wave with an envelope frequency corresponding to the low frequency component of the carrier wave input.

7. In a network, a two part signal device for developing a carrier wave modulated by two frequency components, the first part having three legs whose voltage relationship is varied in response to the displacement of the second part relative to the first part, a balanced demodulator connected to the signal device and becoming unbalanced to develop a differential direct current whose magnitude and sense correspond to the amplitude and phase of the difference in voltage level between two of the legs with respect to the third leg, a delay network responsive to one frequency component, and a modulator energized by a carrier wave for applying to said carrier wave a modulation frequency corresponding to said one frequency component.

8. In a network, a two part signal device for developing a carrier wave modulated by two frequency components, the first part having three legs whose voltage relationship is varied in response to the displacement of the second part relative to the first part, a balanced demodulator connected to the signal device and becoming unbalanced to develop a differential direct current whose magnitude and sense correspond to the amplitude and phase of the difference in voltage level between two of the legs relative to the third leg, a delay network responsive to one frequency component for developing an output corresponding thereto, and a modulator energized by a carrier wave and receiving said last named output and modulating the carrier wave thereby to develop an output corresponding to the carrier wave with an envelope frequency corresponding to said one frequency component.

References Cited in the file of this patent

UNITED STATES PATENTS

| | | |
|---|---|---|
| 2,397,477 | Kellogg | Apr. 2, 1946 |
| 2,455,332 | Hare | Nov. 30, 1948 |
| 2,666,845 | Colton et al. | Jan. 19, 1954 |

FOREIGN PATENTS

| | | |
|---|---|---|
| 625,478 | Great Britain | June 28, 1949 |